March 5, 1929.  M. O. JENNINGS ET AL  1,704,089
ADHESIVE APPLYING AND PRESSING MACHINE
Filed Oct. 21, 1925   5 Sheets-Sheet 1
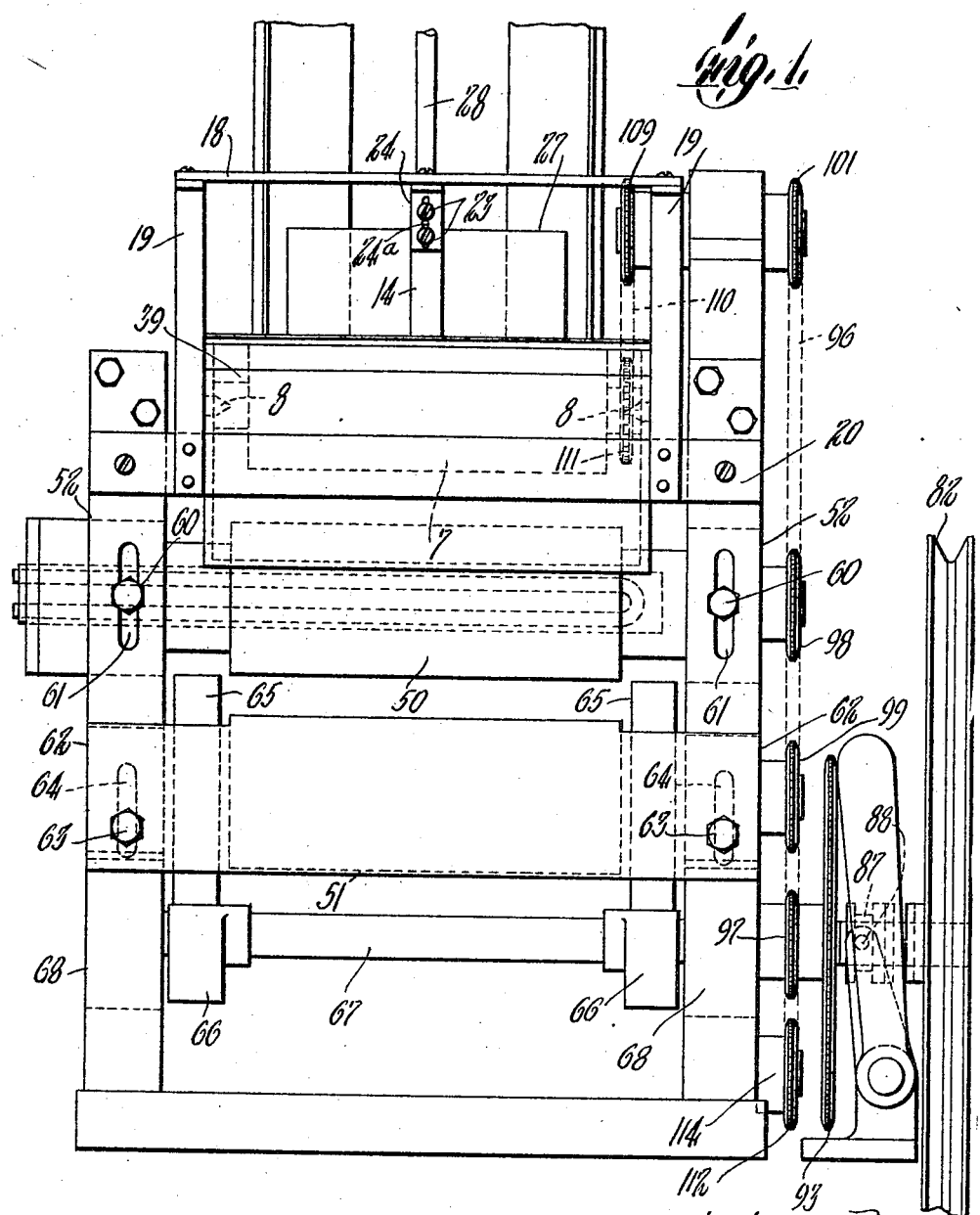

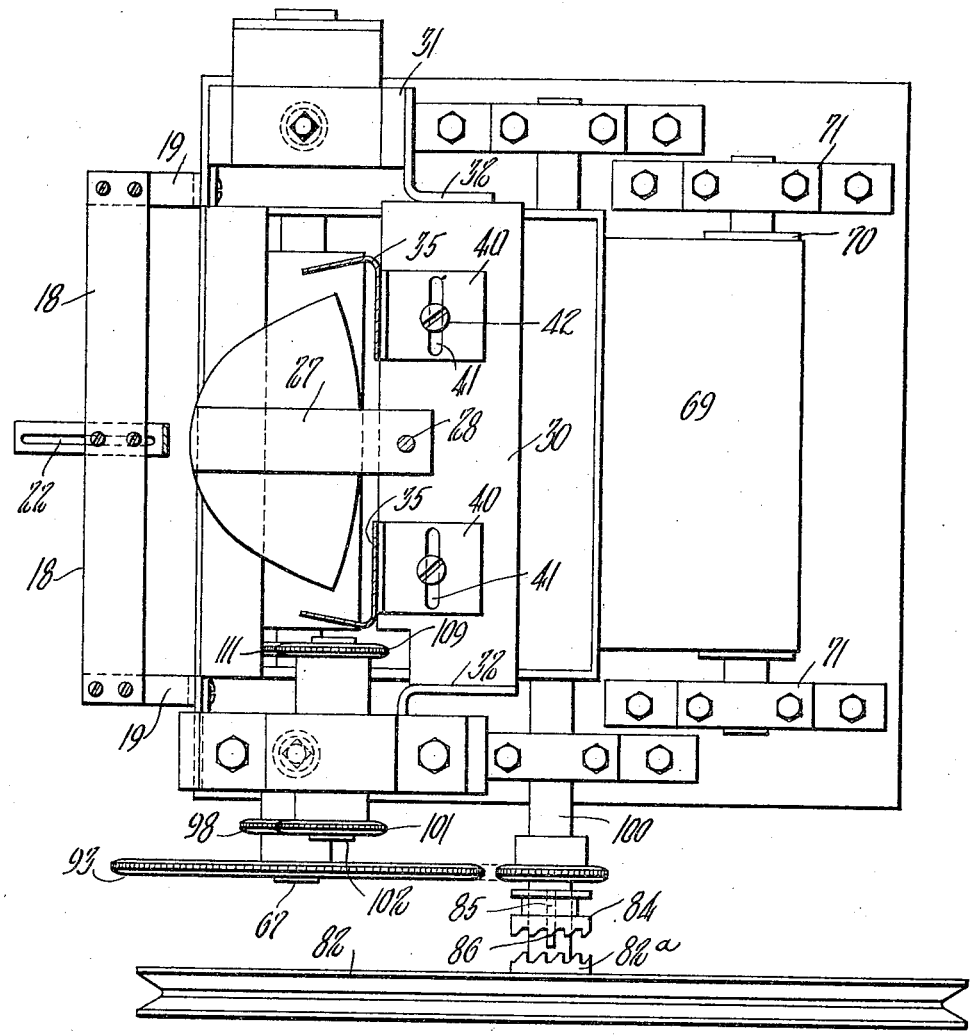

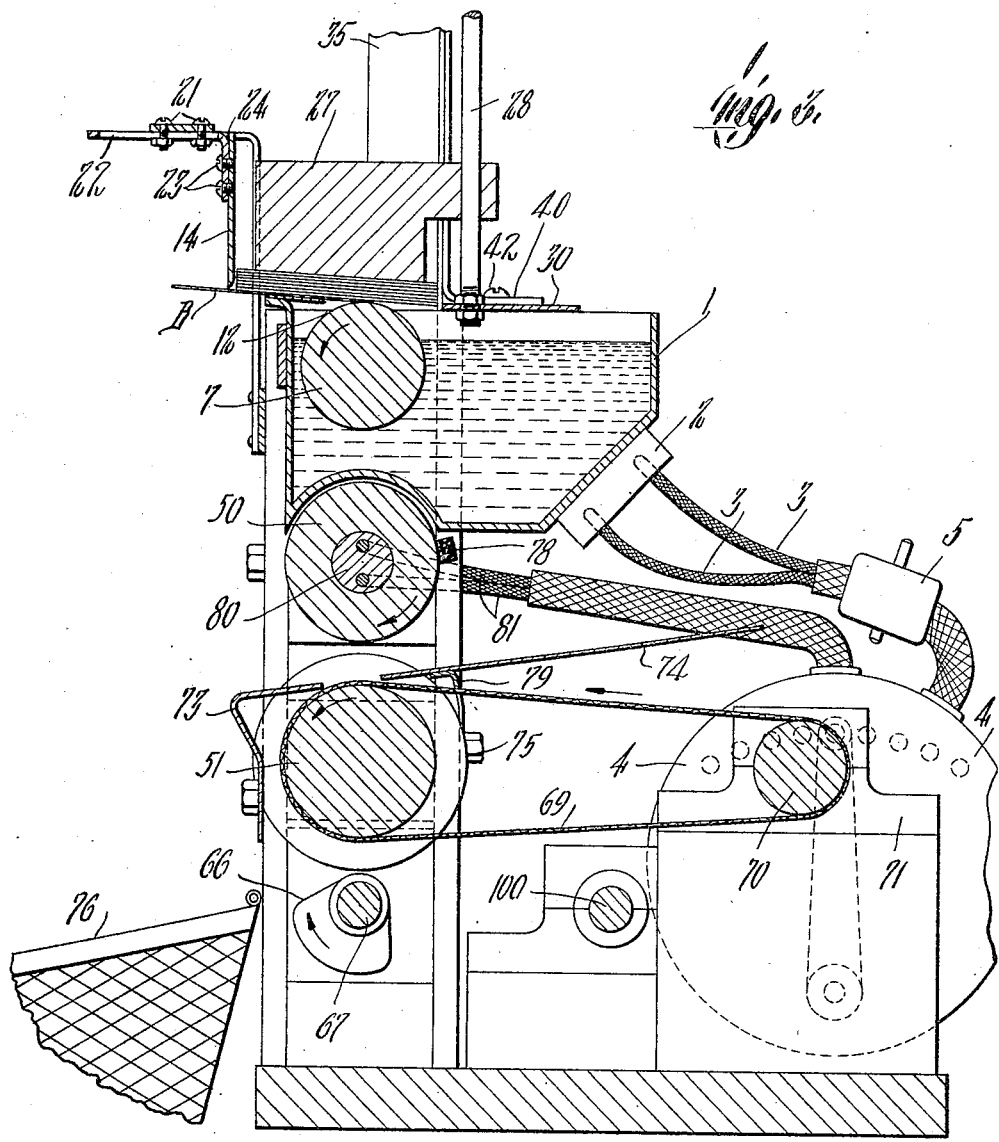

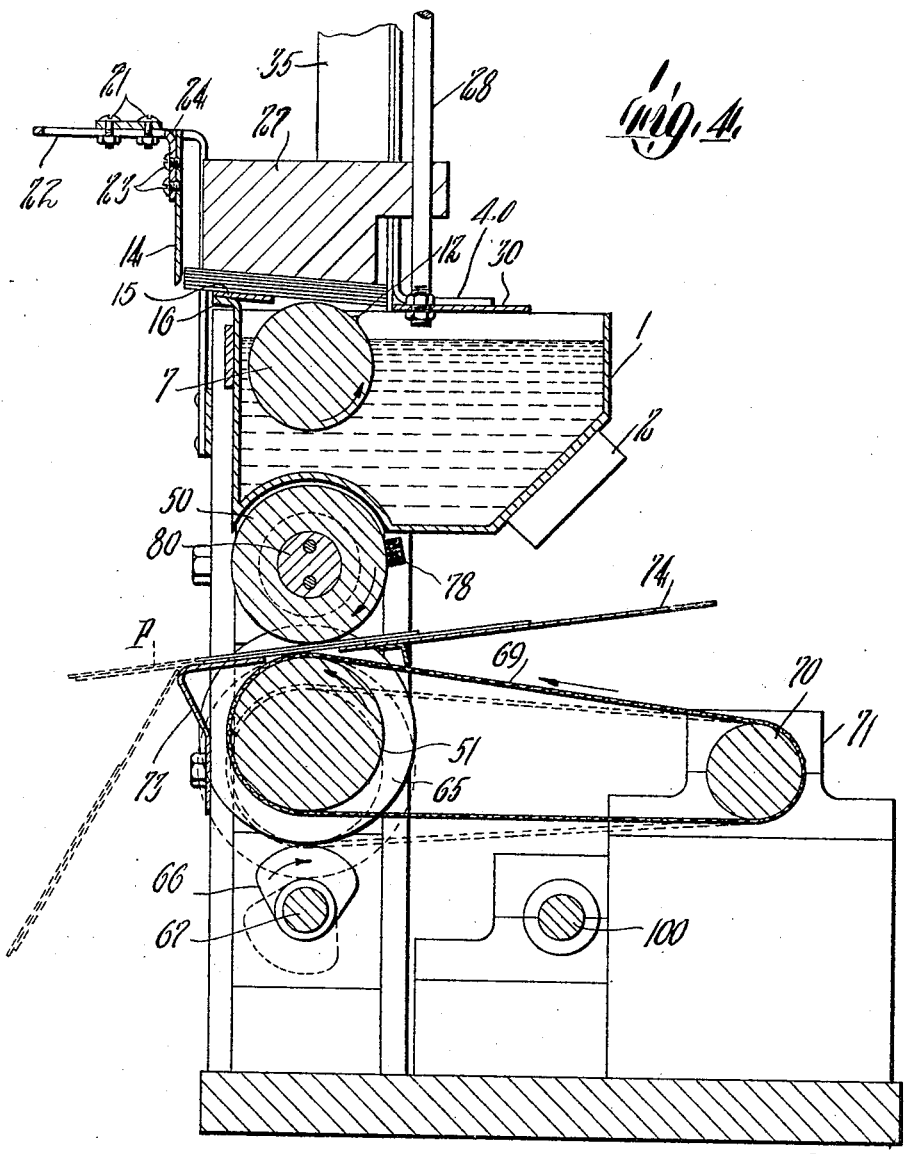

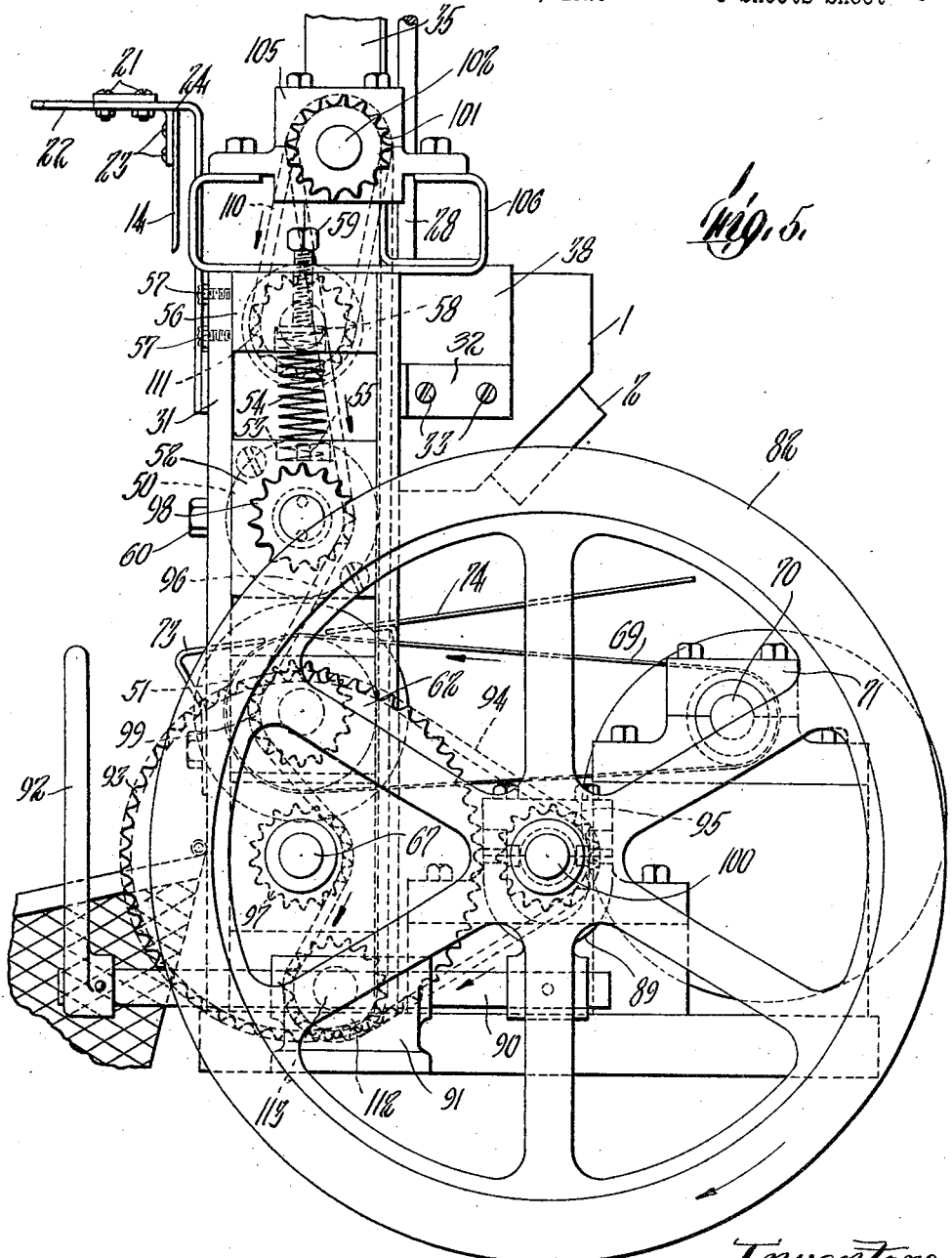

Patented Mar. 5, 1929.

1,704,089

UNITED STATES PATENT OFFICE.

MELVIN O. JENNINGS, OF ARLINGTON HEIGHTS, AND LYMAN E. ALLEY, OF NORTH CAMBRIDGE, MASSACHUSETTS, ASSIGNORS TO HARRY H. BECKWITH, OF BROOKLINE, MASSACHUSETTS.

ADHESIVE APPLYING AND PRESSING MACHINE.

Application filed October 21, 1925. Serial No. 63,914.

This invention in its broadest aspects relates to a machine for applying an adhesive to a material prior to the superposition or placement of another material thereover, and for uniting both materials under pressure.

More particularly, this invention has relation to a machine for applying an adhesive to a box toe stiffener or blank, after which it may be superposed by the machine operator on the toe of a shoe upper and both parts may be united or bound together by subjecting them to pressure. The object of the present invention is to provide a machine for carrying out such operations in an efficient and economical manner.

In accordance with the present invention, a suitable adhesive is first applied to and properly distributed over one surface of the blank, after which it is assembled with the upper, and both parts are united under pressure. For permitting this operation to be accomplished, the machine of the present invention, generally stated, comprises a magazine into which a plurality of blanks may be stacked and guided in proper position and alinement to an adhesive-applying roll. The roll contacts with the under surface of the lowermost blank and distributes adhesive thereonto near its rear edge portion, after which it engages the blank and sufficiently ejects or pushes it forward from the magazine, so that it may be grasped and removed therefrom by the machine operator. The operator then assembles the box toe of the upper with the blank preparatory to placing the parts between rotating superposed pressure rolls, which serve to unite the parts under pressure.

The lower roll is provided with an endless carrier passing loosely thereover, and is reciprocated during rotation into and out of pressing engagement with the upper press roll. Thus, the loosely mounted endless carrier is caused to travel in the direction of the confronting surfaces of the rolls only while they are in pressing engagement with each other, in a manner to cause the parts placed between the rolls to be fed forwardly in the nip of the rolls and out of the machine. The sequence of operations performed by the machine is so timed that the various steps in the process are coordinated; that is to say, during the application of adhesive to a blank, the press rolls are brought and maintained in pressing engagement with each other, but when a blank has been ejected or pushed forward from the magazine after the application of adhesive thereto so that it may be grasped by the operator for assembly in the upper, the pressed parts are ejected from the machine by the carrier and the rolls are separated or brought out of pressing engagement with one another, so that the parts to be united under pressure may be placed therebetween. With these and other features and objects in view, the machine embodying the present invention includes certain novel features of construction, combinations and arrangements of parts, as will be more fully hereinafter described in conjunction with the accompanying drawings, wherein Figure 1 represents in front elevation a machine embodying the present invention.

Figure 2 represents a plan view of the same.

Figure 3 shows a transverse section through the machine, illustrating the lower press roll lowered out of pressing engagement with the upper press roll and ready for the placement of the parts to be united therebetween.

Figure 4 is a section through the machine similar to Figure 3, but illustrating the lower press roll raised into pressing engagement with the upper press rolls, and the parts to be united under pressure placed therebetween.

Figure 5 is an end elevation of the machine, showing the driving mechanism for the several rolls.

Referring to the drawings, at 1 is indicated a tank or receptacle for containing the adhesive or gum to be applied to the blank. Any suitable adhesive may be employed, but for the particular purpose at hand a thermoplastic adhesive or cement which is rendered adhesive and plastic or semi-fluid under the application of heat, and which congeals or hardens and loses its adhesiveness at ordinary or room temperature, is preferably employed. For heating the adhesive contained in the tank, suitable heating means, as for example, an electrical heating device 2 located immediately adjacent to one side of the tank, may be provided. The device is supplied with current through the conductors 3, 3 from a rheostat control unit indicated as a whole at 4, by means of which the amount of current supplied to the heating device may be regulated. The conductors 3, 3 are preferably intercepted by the switch 5, so that the current to the heating device may be turned on or off, as desired.

The adhesive is applied to the lowermost blank B by the adhesive-applying roll 7, which is journaled for rotation on cone spindles 8, 8 protruding laterally from the sides of the tank and engaging in mating openings formed at the ends of the roll. The roll is partially submerged in the adhesive and in rotation therein becomes coated with the adhesive and deposits a film on the under face of the lowermost blank contacting therewith at its rear edge portion. For ejecting or pushing the blank forward from the other blanks of the stack sufficiently so that it may be grasped by the machine operator and removed from the magazine, the roll is provided with a series of prongs 12, arranged longitudinally of its periphery, which engages the blank after the application of the adhesive for a complete revolution of the roll and feed or thrust it frontwardly under the front guide 14, which constitutes a member of the magazine. To allow blanks of different thicknesses to be thrust forward from the magazine by the roll while holding back the blanks superposed on the blank to be ejected, the guide 14 is adjustably supported by a vertical leg of the angle piece 24, by screws 23, 23 fixed thereto and passing through an elongated vertical slot 24ª formed in the leg. By loosening the screws, the guide 14 may be moved up or down to allow the ejection of a blank of any thickness from the magazine. The horizontal leg of the piece 24 is adjustably secured to a transverse bar 18 carried by vertical rods 19, 19, which are fixed to a cross strut 20 of the frame. The adjustment is afforded by means of the bolts 21, 21, which extend through an elongated slot 22 formed in the angle piece 24. By loosening the bolts 21, 21, the guide 14 may thus be adjusted toward and away from the stack of blanks, depending on the particular sized blank being utilized.

The magazine also comprises the plate 15 for supporting the stack of blanks, suitably secured to the flange 16 projecting frontwardly at the upper edge portion of the front side of the tank. The stack of blanks is supported on the plate, its front portion extending beyond the plate and its rear portion resting on the roll 7 so that the under face of the lowermost blank contacts with the roll as already indicated, near its rear edge. The blank is preferably made to contact with the roll under pressure, so that an efficient application and uniform distribution of adhesive will be effected upon a blank. This pressing action on the blanks may be produced by a weight 27, placed on the top of the stack and having an opening formed therethrough at its rear portion, for a guiding post 28. The post is threaded at its butt end and screwed into and secured in place by fixing nuts to a plate 30 extending across the open top of the tank, and the end portions 38, 38 of this plate are bent downwardly and perpendicular thereto, so as to abut against the side of the tank. The end portions may be secured to the uprights 31, 31 of the frame by angle pieces 32, 32. As a detail of construction, the screws 33, 33 for fastening the angle piece to the plate 30 may extend through the sides of the tank, as well as through the portions 38, 38, thus serving to support the rear end of the tank. The front end of the tank may be fixed to a cross-piece 39 secured to the vertical rods 19, 19.

The plate 30 also serves to support vertical rear guides forming a part of the magazine which maintains the stack of blanks so that they may be presented in proper position to the adhesive-applying roll 7. These guides are constructed in the form of angular vertical members 35, adjustable toward and away from each other in a manner to permit blanks of different widths to be accommodated therebetween. The adjustability is accomplished by mounting each member on a base 40 provided with an elongated slot 41 through which a screw 42 for fixing the base to the plate 30 extends. By loosening the screw, the guide may be moved toward or away from the other guide, as desired.

Passing now to a description of the mechanism for subjecting the assembled parts to pressure, as previously indicated, the machine comprises an upper roll 50 mounted for rotation immediately under the tank, and a rotatable lower roll 51 adapted to be reciprocated into and out of pressing engagement therewith during the rotation of the rolls. The roll 50 is journaled for rotation at either end in a block 52, which is yieldable away from the lower press roll 51 when the latter is brought up into pressing engagement therewith. To this end, bearing down against each block is a compression spring 54, the lower portion of which extends into an opening 53 formed in the upper portion of the block, and which is maintained in proper position and alinement by a pin 55 projecting upwardly from the base of the opening, into the spring. Similarly, the upper portion of the spring extends into an opening formed in a block 56, which is fixed by bolts 57, 57 to the vertical upright 31. For regulating the yieldingness of the upper roll and thus the pressure exerted on the parts to be united by the rolls, a disc 58 rests on the spring at its upper end, against which a set screw 59 extending through the block 56 bears. To limit and guide the movement of the blocks 52, they are provided with bolts 60, riding in slots 61 formed in the uprights 31, 31.

The lower roll 51 is journaled at either end in the blocks 62, 62, which are mounted in the frame in a manner to permit reciprocation thereof into and out of pressing engagement with the upper roll. To this end, each block is slidably supported by a bolt 63 engaging in a slot 64 formed in the corresponding upright 31. The reciprocating motion is imparted to the roll by edge cams 66, 66, through annular rollers 65, 65, journaled thereon at either end, with which the cams make rolling contact.

An endless carrier or belt 69 passes loosely over the lower roll 51 and a rear roll 70, which is journaled at either end in a pillow block 71. Thus, while the revolving roll 51 is out of pressing engagement with the upper roll, the carrier remains stationary; but when the roll is elevated into pressing engagement therewith, the carrier is frictionally engaged by the rolls and caused to travel in the same direction therewith.

The lower roll is accompanied in its reciprocating motion by a pair of spaced supports or shelves 73, 74 for maintaining the parts to be pressed, accurately in place between the rolls. The front shelf 73 may be secured to the blocks 62 by passing the bolts 63 through suitable openings formed therein. The rear shelf 74 is spaced from the front shelf sufficiently to permit the rolls to be brought into pressing engagement with one another, and is secured at each end by a screw 75 to the block 62. For removing adhesive from the surfaces contacting with the parts, doctors or scrapers 78 and 79, respectively engaging the surface of the upper press roll and the surface of the endless carrier, are provided.

It is of course evident that it is desirable to maintain the thermoplastic adhesive in plastic or adhesive condition while the parts are undergoing the pressing operation, in order to unite or bind them together effectively. Hence provision is made for heating one of the rolls, preferably the upper roll, which directly contacts with the parts to be united. This may be accomplished in a practical and convenient manner by inserting a removable electric heating unit 80 into a suitable chamber or compartment formed within the roll. The heating unit may be connected through the conductors 81, 81 to the rheostat 4, by means of which the amount of current supplied thereto, and thus its temperature, may be controlled. In starting up the machine in the morning, the rheostat is set and the switch 5 is thrown on, whereupon the device 2 is kept going until the thermoplastic adhesive has become sufficiently plastic to commence operation. The switch 5 may then be thrown off and the heat supplied to the tank by radiation from the upper press roll located immediately thereunder in an arcuate space afforded by the construction of the bottom of the tank is ordinarily sufficient to maintain the adhesive in proper condition. It should be obvious, however, that heating may be dispensed with in a machine where a cement or adhesive not requiring heat is employed.

The various rolls are preferably driven from a common motor or other source of power (not shown), which may be built into the machine, if desired, through a belt by a pulley 82 loosely mounted on the driving shaft 100. The shaft is provided at one end with a tooth clutch member 84 having a feather key 85 engaging in a longitudinal groove 86 formed in the shaft in a manner to permit axial or longitudinal movement of the member. This movement permits it to be engaged with or disengaged from the other clutch member 82ᵃ on the pulley 82, so that rotation may be imparted to the shaft 100 as desired. The axial movement may be imparted to the clutch member 84 through rollers 88, 88 engaging in an annular way 87 formed thereon. The rollers are mounted on the forks afforded by a yoke 89, the opposite end of which is affixed to a rock shaft 90 suitably journaled in a bearing 91. To the outer end of the shaft is fixed a handle 92, by means of which the shaft 90 may be rocked to throw the clutch member 84 into and out of engagement with the complemental clutch member 82ᵃ on the driving pulley 82.

The cam shaft 67 is driven from the shaft 100 by a sprocket 93, through a chain 94 passing over a sprocket 95 fixed at one end of the shaft 100. The rolls 51 and 52 are driven through the chain 96 passing over a sprocket 97 fixed at one end of the shaft 67 and passing over sprockets 98, 99 fixed to the respective rolls. The chain 96 also passes over a sprocket 101 fixed at one end of a shaft 102, which serves as a driving shaft for the adhesive-applying roll. The shaft 102 is journaled in a bearing block 105 which is bolted to a bracket 106 secured to the block 56. The other end of the shaft 102 is provided with a sprocket 109, over which a chain 110 passes, driving the roll 7 through the sprocket 111 fixed at one end thereto. The chain 96 preferably also passes over an idle sprocket 112 fixed to a shaft 113 which is journaled in a block 114. This block is supported so as to be horizontally adjustable so that the chain may be tightened or slackened.

After a blank from the stack has been suitably coated with adhesive and thrust forwardly under the guide 14, the operator grasps and withdraws it from the magazine, and emplaces the superposed parts P between the press rolls on the shelves 73 and 74, which are at this particular time lowered in position for their reception. With the parts placed therebetween, the lower press roll is reciprocated into pressing engagement with the upper press roll, and the endless carrier is caused to travel in the direction of the rolls by frictional engagement therewith, in a manner to feed the parts forwardly between the nip of the rolls onto the front shelf 73, from which they fall and are discharged into a basket 76 attached to the frame. The lower roll is then reciprocated out of pressing engagement with the upper roll, whereupon the ejection of an adhesive-coated blank from the magazine again occurs, and the sequence of steps is repeated. Thus the ejection of a blank and the disengagement of the press rolls occur at properly timed intervals, so that the operator has sufficient time to assemble the blank with the upper and then place the parts between the press rolls before they are brought into pressing engagement. The endless carrier affords a resilient cushion between the surfaces of the press rolls, on which any excess adhesive which is squeezed from the parts is deposited. With the large surface afforded by the endless carrier, if a portion of the surface is gummed up with adhesive in a pressing operation, the shoe upper undergoing treatment in the succeeding pressing operation remains unaffected, and is not smeared or soiled therewith, since another surface of carrier is presented for the new pressing operation. Such a carrier is especially advantageous when a thermoplastic adhesive is employed, since when the gummed-up surface of the carrier is again available for a pressing operation, the thermoplastic adhesive deposited thereon has become sufficiently congealed or hardened to lose its adhesiveness and will not tend to smear or soil the upper.

Having thus described this invention, it is evident that various changes might be resorted to in form, construction and arrangement of the parts without departing from the spirit or scope of the invention. Hence we do not wish to limit ourselves strictly to the structure herein set forth.

What we claim is:

1. In a machine of the class described, a pair of press rolls, means for positively rotating both said rolls, means for bringing the rolls into and out of pressing engagement at regular intervals during such rotation, and an endless carrier passing loosely over one of said rolls and actuable by said rolls only while in pressing engagement to travel in the direction of the confronting surfaces of said rolls.

2. In a machine of the class described, a pair of press rolls, means for positively rotating both said rolls, means for reciprocating one of said rolls into and out of pressing engagement with the other roll at regular intervals during such rotation, and an endless carrier passing loosely over one of said rolls and between the two rolls.

3. In a machine of the class described, a pair of superposed press rolls, means for positively rotating both said rolls, means for reciprocating the lower roll into and out of pressing engagement with said upper roll at regular intervals during such rotation, and an endless carrier passing loosely over said lower roll and actuable by said rolls only while in pressing engagement to travel in the direction of the confronting surfaces of said rolls.

4. In a machine of the class described, a pair of superposed press rolls, the upper roll of which is yieldingly mounted, means for positively rotating both said rolls, means for reciprocating the lower roll into and out of pressing engagement with said upper roll at regular intervals during such rotation, and an endless carrier passing loosely over said lower roll and actuable by said rolls only while in pressing engagement to travel in the direction of the confronting surfaces of said rolls.

5. In a machine of the class described, a pair of superposed press rolls, the upper roll of which is yieldingly mounted; means for positively rotating both said rolls; means for reciprocating the lower roll into and out of pressing engagement with the upper roll at regular intervals during such rotation; an endless carrier loosely passing over said lower roll and actuable by said rolls only while in pressing engagement to travel in the direction of the confronting surfaces of said rolls and means for adjusting the pressing action exerted by said rolls.

6. In a machine of the class described, a pair of superposed press rolls; means for positively rotating both said rolls; means for reciprocating the lower roll into and out of pressing engagement with the upper roll at regular intervals during such rotation; an endless carrier passing loosely over said lower roll and actuable by said rolls only while in pressing engagement to travel in the direction of the confronting surface of said rolls; and means for supporting the material to be pressed, placed between said rolls.

7. In a machine of the class described, a pair of superposed press rolls; means for positively rotating both said rolls; means for reciprocating the lower roll into and out of pressing engagement with the said upper roll at regular intervals during such rotation; an endless carrier passing loosely over said lower roll and actuable by said rolls only while in pressing engagement to travel in the direction of the confronting surfaces of the rolls; and supports reciprocating with said lower roll, for supporting the material to be pressed placed between the rolls.

8. In a machine of the class described, a pair of superposed press rolls, the upper roll of which is yieldingly mounted; means for positively rotating both said rolls; means for reciprocating the lower roll into and out of pressing engagement with said upper roll at regular intervals during such rotation; an endless carrier passing over said lower roll and actuable by said rolls only while in pressing engagement to travel in the direction of the confronting surfaces of said rolls; means for adjusting the pressing action exerted by said rolls; and supports reciprocating with the lower roll for maintaining the material to be pressed, emplaced between the rolls.

9. In a machine of the class described, the combination of a magazine for supporting a stack of superposed blanks; means for applying an adhesive to the lowermost blank of said stack and for ejecting said blank from said magazine after the application of such adhesive; a pair of pressing members; and means synchronized with said adhesive applying and blank ejecting means for bringing said members into pressing engagement with one another during the application of adhesive to a blank, and out of pressing engagement when a blank has been ejected from said magazine.

10. In a machine of the class described, the combination of a magazine for supporting a stack of superposed blanks; means for applying an adhesive to the lowermost blank of said stack and for ejecting said blank from said magazine after the application of such adhesive; a pair of superposed press rolls; means for rotating said rolls; means synchonized with said adhesive applying and blank ejecting means for reciprocating the lower roll into pressing engagement with said upper roll during the application of adhesive to a blank, and out of pressing engagement with the upper roll when a blank has been ejected from said magazine; and an endless carrier passing loosely over said lower roll and between the two rolls.

11. The combination, in a machine of the class described, of a magazine for supporting and guiding a stack of blanks; a tank for containing an adhesive; an adhesive-applying roll partially submerged in said adhesive and contacting with the under face of the lowermost blank; means for rotating said roll; a series of prongs arranged longitudinally on the periphery of said roll and adapted to engage the lowermost blank in a manner to eject it from said magazine; a pair of superposed press rolls; means for rotating said rolls; means for reciprocating the lower roll into pressing engagement with said upper roll during the application of adhesive to a blank, and out of pressing engagement with the upper roll when a blank has been ejected from said magazine; and an endless carrier passing loosely over said lower roll and between the two rolls.

12. In a machine of the class described, a pair of rolls, means for positively rotating both said rolls, means for periodically bringing the rolls into and out of pressing engagement during said rotation, means for heating one of said rolls, and an apron passing loosely over the other of said rolls and between the two rolls.

13. In a machine of the class described, a pair of rolls in superposed relation, means for rotating said rolls, means for reciprocating the lower roll into and out of pressing engagement with the upper roll, an apron passing loosely over the lower roll and actuable by said rolls while in pressing engagement to travel in the direction of the confronting surfaces of said rolls, a magazine for supporting a stack of blanks, means for applying adhesive to the bottom-most blank and ejecting it from the magazine, a tank for adhesive, means for supporting said tank above and in close juxtaposition to said upper roll, and means within the upper roll for heating the roll and the contents of the tank.

14. In a machine of the class described, a magazine for a stack of blanks, means for applying adhesive successively to the blanks, a tank for adhesive and means for heating said tank and for pressing blanks, said heating and pressing means comprising a pair of press rolls, one of said rolls being located beneath and close to said tank and having a heating element therewithin.

In testimony whereof we have affixed our signatures.

MELVIN O. JENNINGS.
LYMAN E. ALLEY.